No. 767,879. PATENTED AUG. 16, 1904.
F. S. FOOTE.
BOX.
APPLICATION FILED APR. 23, 1904.
NO MODEL.

Witnesses

Inventor
F. S. Foote.
By James J. Shehy
Attorney

No. 767,879.      Patented August 16, 1904.

UNITED STATES PATENT OFFICE.

FRANKLIN S. FOOTE, OF BARABOO, WISCONSIN, ASSIGNOR OF TWO-THIRDS TO WILLIAM G. LA RUE AND HERMAN GROTOPHORST, OF BARABOO, WISCONSIN.

BOX.

SPECIFICATION forming part of Letters Patent No. 767,879, dated August 16, 1904.

Application filed April 23, 1904. Serial No. 204,617. (No model.)

*To all whom it may concern:*

Be it known that I, FRANKLIN S. FOOTE, a citizen of the United States, residing at Baraboo, in the county of Sauk and State of Wisconsin, have invented new and useful Improvements in Boxes, of which the following is a specification.

My invention pertains to boxes, more particularly folded-blank boxes; and it has for one of its objects to provide a box in which a number of eggs may be carried in such manner that liability of any of the eggs being broken or deteriorated in quality is reduced to a minimum.

Another object of the invention is to provide an egg-carrying box of such construction that by simply holding the box between the eye and the light the freshness of all of the eggs may be readily ascertained.

Other advantageous features of the invention will be fully understood from the following description and claims when taken in connection with the accompanying drawings, forming part of this specification, in which—

Figure 1:
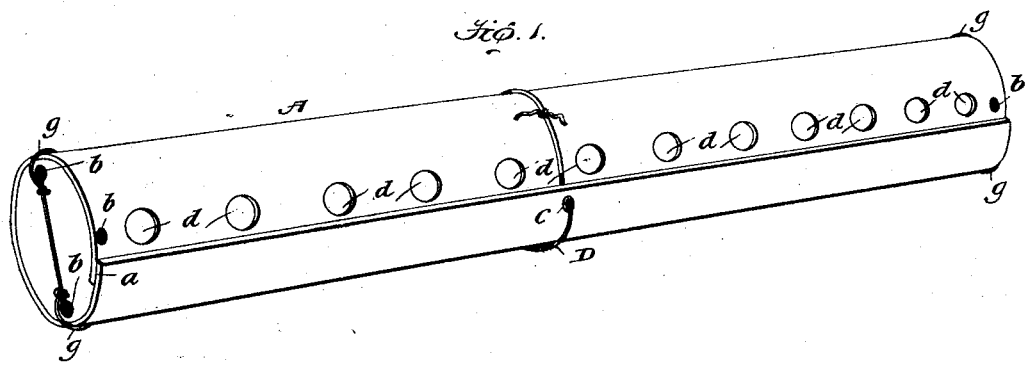
Figure 2:
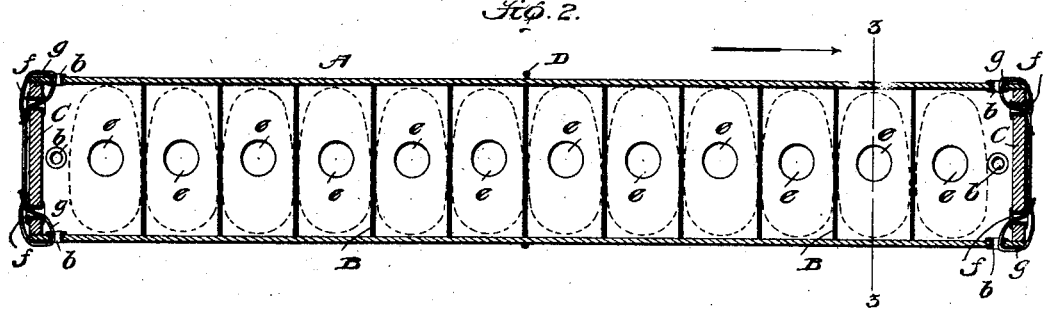
Figure 3:
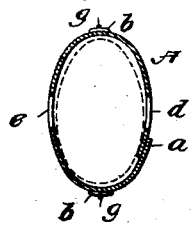
Figure 4:
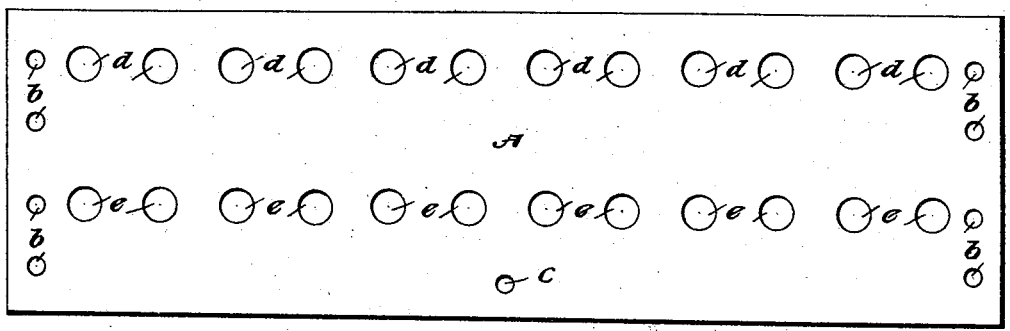

Figure 1 is a perspective view of the box constituting the present and preferred embodiment of my invention as the same appears when in use. Fig. 2 is a longitudinal central section of the box with eggs therein, the eggs being shown by dotted lines. Fig. 3 is a transverse section taken in the plane indicated by the line 3 3 of Fig. 2, and Fig. 4 is a plan view of the box-body as the same appears precedent to being folded or curled into the shape in cross-section shown in Figs. 1 and 3.

Similar letters designate corresponding parts in all of the views of the drawings, referring to which—

A is the body of my novel box, which is preferably formed of an oblong piece of pasteboard or other suitable material folded or curled into the shape shown in Fig. 3 in cross-section and so that its edges are lapped, as indicated by $a$ in said figure. The said body is preferably provided at each of its ends with four (more or less) eyelets $b$ and in its middle, at a point adjacent to its outer edge, with an eyelet $c$, and it is also provided with twelve (more or less) openings $d$ and twelve (more or less) openings $e$, arranged opposite the openings $d$, as best shown in Fig. 3 of the drawings.

B B are layers of pasteboard or other suitable material contained in the body A and interposed between the eggs, Fig. 2, so as to prevent the same contacting with each other, and C C are closure-heads, preferably of pasteboard, arranged in the ends of the body A, so as to retain in said body the contents thereof. The said closure-heads are preferably provided with eyelets $f$, through which are passed cords $g$, which are designed to be passed through and secured in the eyelets $b$ of the body, with a view of fastening the heads in the ends of the body and against casual displacement.

D is a cord passed through the eyelet $c$ of the body and carried around the body and tied, with a view of holding the body closed on the eggs therein.

The box shown and described is designed to hold and carry a dozen eggs, and in practice the eggs and the layers B interposed between the eggs are preferably placed in the body A while said body is open or, in other words, while the longitudinal edges of the body are held apart. The heads C are then placed in the ends of the body and secured through the medium of the cords $g$, after which the cord D is passed through the eyelet $c$ of the body and tied around the same. With this done it will be observed that the eggs are secured in the box in such manner that there is little liability of any egg being broken or deteriorated, also that the box may be conveniently carried in the hand. It will further be observed that a number of the tubes may be readily fastened together or may be hung or otherwise secured in a receptacle in such manner that there is little liability of the eggs being broken or damaged in storage or shipment.

The apertures $d$ $e$ in the body A are advantageous, because they permit of the free circulation of air through the box in close contact with the eggs and also because one of each is disposed at one side of each egg in the box. From this latter it follows that by simply holding the box between his eye and the light a person is enabled to readily note the transparency of each egg and the freshness or lack of freshness of the same.

It will be appreciated from the foregoing that notwithstanding the fact that eggs may be readily placed in and removed from my novel box and carried in the same without liability of breakage the box is simple and inexpensive in construction and is further economical for the reason that it embodies no delicate parts and may therefore be repeatedly used.

I have entered into a detailed description of the construction constituting the present and preferred embodiment of my invention in order to impart a full, clear, and exact understanding of the same. I do not desire, however, to be understood as confining myself to the specific construction and relative arrangement of the parts as shown and described, as such changes or modifications may be made in practice as fairly fall within the scope of my invention as claimed.

Having described my invention, what I claim, and desire to secure by Letters Patent, is—

1. A box for carrying eggs, comprising a tubular body formed of a folded or curled blank and open at its opposite ends and having eyes adjacent to said ends, and also having an eye at an intermediate point of its length and adjacent to one of its longitudinal edges; the said body being further provided with two series of transversely-alined apertures $d\ e$, closure-heads removably arranged in the ends of the body and having eyes, securing-cords passed through the eyes of the body and heads, a securing-cord passed through the eye in the body at an intermediate point in the length thereof, and layers B arranged in the tubular body at points intermediate of the apertures thereof, whereby when eggs are placed in the body between the layers, each egg will rest between alined apertures in opposite sides of the body.

2. A box for carrying eggs, comprising a tubular body formed of a folded or curled blank, and open at its opposite ends, and having eyes adjacent to said ends, and also having an eye at an intermediate point of its length and adjacent to one of its longitudinal edges, closure-heads removably arranged in the ends of the body and having eyes, securing-cords passed through the eyes in the heads and the end eyes of the body, and a securing-cord passed through the intermediate eye of the body.

In testimony whereof I have hereunto set my hand in presence of two subscribing witnesses.

FRANKLIN S. FOOTE.

Witnesses:
HERMAN GROTOPHORST,
ROSE ENNIS.